United States Patent
Schwarz et al.

(10) Patent No.: US 9,253,200 B2
(45) Date of Patent: Feb. 2, 2016

(54) PROGRAMMING VEHICLE MODULES FROM REMOTE DEVICES AND RELATED METHODS AND SYSTEMS

(71) Applicant: GM GLOBAL TECHNOLOGY OPERATIONS LLC, Detroit, MI (US)

(72) Inventors: Jonathan R. Schwarz, Lake Orion, MI (US); Douglas C. Martin, Oxford, MI (US); William E. Mazzara, Jr., Drayton Plains, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 14/064,386

(22) Filed: Oct. 28, 2013

(65) Prior Publication Data
US 2015/0121457 A1    Apr. 30, 2015

(51) Int. Cl.
H04L 29/06 (2006.01)
H04L 9/32 (2006.01)
G06F 3/0484 (2013.01)
G06F 9/445 (2006.01)
G06F 17/30 (2006.01)
H04L 29/08 (2006.01)
G06F 21/57 (2013.01)
G06F 21/44 (2013.01)

(52) U.S. Cl.
CPC ............ *H04L 63/126* (2013.01); *G06F 3/0484* (2013.01); *G06F 8/65* (2013.01); *G06F 17/30091* (2013.01); *G06F 21/44* (2013.01); *G06F 21/572* (2013.01); *H04L 9/32* (2013.01); *H04L 63/08* (2013.01); *H04L 67/12* (2013.01)

(58) Field of Classification Search
CPC ................................. H04L 9/32; H04L 63/126
See application file for complete search history.

(56) References Cited

U.S. PATENT DOCUMENTS

| | | | |
|---|---|---|---|
| 6,438,468 B1* | 8/2002 | Muxlow et al. | 701/3 |
| 6,976,167 B2 | 12/2005 | Nenashev | |
| 7,418,596 B1 | 8/2008 | Carroll et al. | |
| 7,869,906 B2* | 1/2011 | Louch et al. | 701/1 |
| 8,543,805 B2 | 9/2013 | Ovsiannikov | |
| 8,948,934 B2* | 2/2015 | Lee et al. | 701/3 |
| 2008/0269979 A1* | 10/2008 | Hermann et al. | 701/33 |
| 2010/0082559 A1* | 4/2010 | Sumcad et al. | 707/695 |

(Continued)

OTHER PUBLICATIONS

Hossain, Irina; Mahmud, Syed Masud; Hwang, Moon Ho; "Performance Evaluation of Mobile Multicast Session Initialization Techniques for Remote Software Upload in Vehicle ECUs", IEEE 72nd Vehicular Technology Conference, Sep. 6-9, 2010, 5 pages.*

(Continued)

*Primary Examiner* — Victor Lesniewski
(74) *Attorney, Agent, or Firm* — Ingrassia Fisher & Lorenz, P.C.

(57) ABSTRACT

Methods, apparatus and systems are provided for programming a vehicle module. An exemplary vehicle includes a first module, an authentication module communicatively coupled to the first module, and an update module communicatively coupled to the first module and the authentication module. The update module is configured to obtain a programming update for the first module that includes an authentication portion and a programming data portion. The update module provides the programming data portion to the first module and provides the authentication portion to the authentication module. The authentication module provides the authentication portion to the first module after the authentication portion is authenticated.

18 Claims, 4 Drawing Sheets

(56) References Cited

U.S. PATENT DOCUMENTS

| | | | | |
|---|---|---|---|---|
| 2011/0083161 | A1* | 4/2011 | Ishida | H04L 12/40 726/2 |
| 2011/0197187 | A1* | 8/2011 | Roh | G06F 8/65 717/173 |
| 2011/0215758 | A1* | 9/2011 | Stahlin et al. | 320/109 |
| 2012/0143402 | A1* | 6/2012 | Kim et al. | 701/2 |
| 2012/0221173 | A1* | 8/2012 | Ampunan | B60R 16/037 701/2 |
| 2013/0079950 | A1* | 3/2013 | You | 701/1 |
| 2013/0173112 | A1 | 7/2013 | Takahashi et al. | |
| 2013/0179689 | A1* | 7/2013 | Matsumoto et al. | 713/171 |
| 2013/0185766 | A1* | 7/2013 | Fujiki | H04L 63/08 726/3 |
| 2013/0261941 | A1* | 10/2013 | Nishimura | F02N 11/0807 701/113 |
| 2013/0268754 | A1* | 10/2013 | Baltes et al. | 713/156 |
| 2013/0275761 | A1* | 10/2013 | Catsburg et al. | 713/176 |
| 2013/0318357 | A1* | 11/2013 | Abraham et al. | 713/176 |
| 2013/0339721 | A1* | 12/2013 | Yasuda | 713/100 |
| 2014/0114497 | A1* | 4/2014 | Miyake | 701/1 |
| 2014/0164768 | A1 | 6/2014 | Kruglick | |
| 2014/0325602 | A1* | 10/2014 | Kwon | H04L 63/08 726/4 |
| 2015/0051787 | A1* | 2/2015 | Doughty et al. | 701/31.5 |
| 2015/0095997 | A1* | 4/2015 | Mabuchi | 726/6 |

OTHER PUBLICATIONS

Khanapurkar, Milind; Bajaj, Preeti; Gharode, Dakshata; "A Design Approach for Intelligent Vehicle Black Box System with Intra-vehicular communication using LIN/Flex-ray Protocols", IEEE International Conference on Industrial Technology, Apr. 21-24, 2008, 6 pages.*

Jing Zhu and Sumit Roy, MAC for Dedicated Short Range Communications in Intelligent Transport System, IEEE Communications Magazine, Dec. 2003, 0163-6804/03, pp. 60-67.

U.S. Appl. No. 14/064,425, filed Oct. 28, 2013.

USPTO, Response to Office Action for U.S. Appl. No. 14/064,425 mailed Feb. 26, 2015.

USPTO, Office Action for U.S. Appl. No. 14/064,425 mailed Dec. 3, 2014.

USPTO, Final Office Action for U.S. Appl. No. 14/064,425 mailed Jun. 4, 2015.

USPTO, Notice of Allowance for U.S. Appl. No. 4/064,425 mailed Sep. 21, 2015.

USPTO, Notice of Allowance and Fee(s) Due in U.S. Appl. No. 14/064,425, mailed Sep. 21, 2015.

* cited by examiner

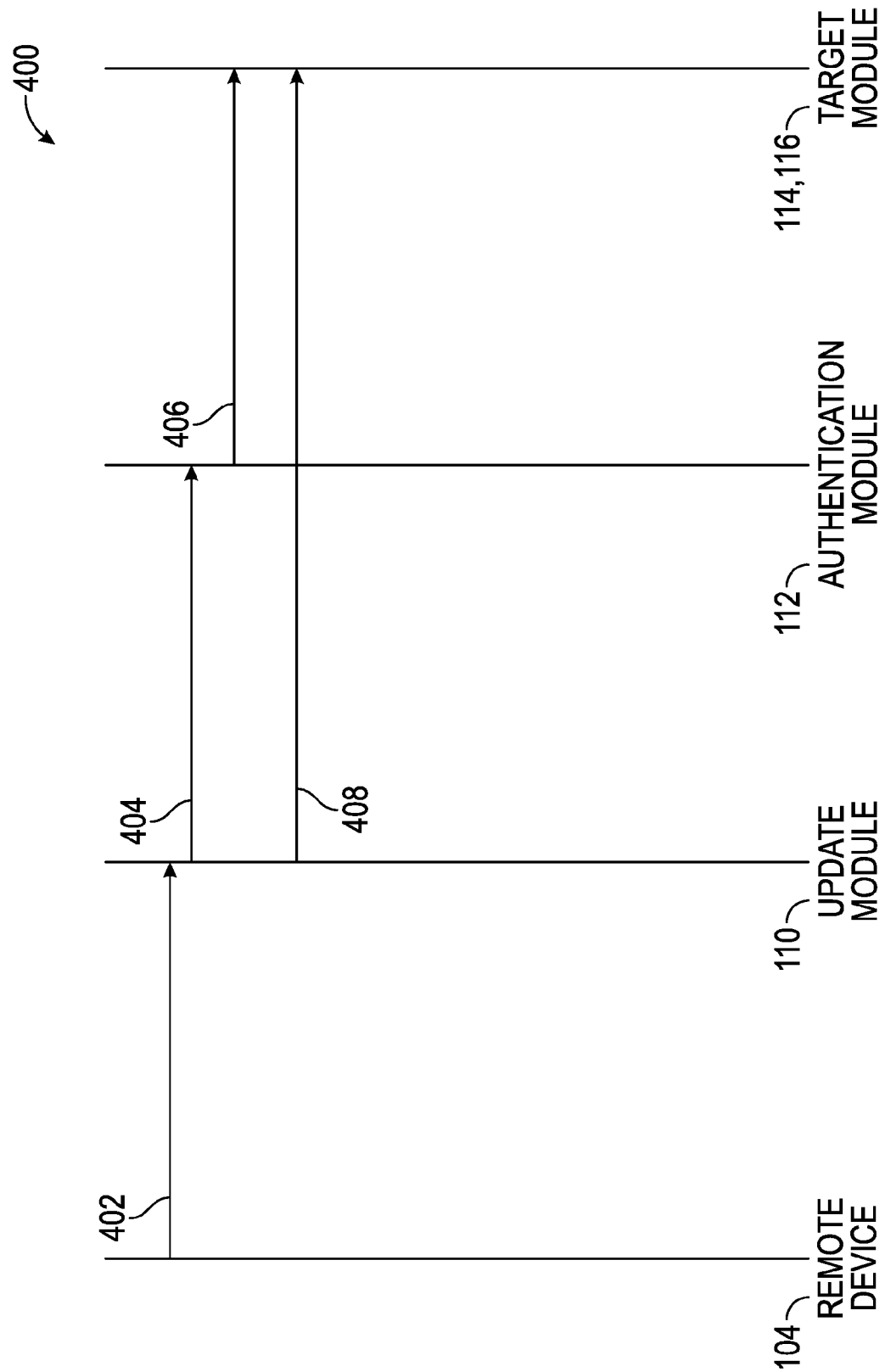

PROGRAMMING VEHICLE MODULES FROM REMOTE DEVICES AND RELATED METHODS AND SYSTEMS

CROSS-REFERENCE TO RELATED APPLICATIONS

The subject matter described herein is related to the subject matter described in U.S. patent application Ser. No. 14/064,425, filed concurrently herewith.

TECHNICAL FIELD

Embodiments of the subject matter described herein generally relate to vehicle systems, and more particularly relate to systems and methods for securely programming a module within a vehicle using programming information from a remote device.

BACKGROUND

In recent years, advances in technology have led to substantial changes in the design of automotive vehicles. Modern vehicles include a number of electronic components, such as, for example, engine control units (ECUs), traction control systems, power steering systems, braking systems, climate control systems, navigation systems, infotainment systems, and the like. Additionally, modern vehicles often are capable of supporting communications to/from external components, for example, via external communications networks (e.g., cellular networks, wireless networks, personal area networks, or the like) or a physical interface (e.g., a bus interface or the like).

During the lifetime of a vehicle, it may be desirable to reprogram or otherwise update one or more of the vehicle electronic components, for example, to support or otherwise provide new features and/or functionality or to resolve potential issues with existing features and/or functionality. Allowing vehicles to receive updates or otherwise be reprogrammed from an external component poses numerous cybersecurity risks. Accordingly, it is desirable to provide systems and methods for securely programming vehicle electronic components while minimizing vulnerability or susceptibility to cyberattacks. Other desirable features and characteristics will become apparent from the subsequent detailed description and the appended claims, taken in conjunction with the accompanying drawings and the foregoing technical field and background.

SUMMARY

In one of various exemplary embodiments, an apparatus for a vehicle is provided. The vehicle includes a first module, an authentication module communicatively coupled to the first module, and an update module communicatively coupled to the first module and the authentication module. The update module is configured to obtain a programming update for the first module that includes an authentication portion and a programming data portion. The update module provides the programming data portion to the first module and provides the authentication portion to the authentication module. The authentication module provides the authentication portion to the first module after the authentication portion is authenticated.

In another embodiment, a method of programming a vehicle module is provided. The method involves obtaining, from a remote device, a programming update for the vehicle module that includes an authentication portion and a programming data portion. The method continues by providing the authentication portion to an authentication module coupled to the vehicle module and providing the programming data portion to the vehicle module. After authenticating the authentication portion, the method continues by providing the authentication portion from the authentication module to the vehicle module and updating the vehicle module based at least in part on the programming data portion after providing the authentication portion to the vehicle module.

According to another of various exemplary embodiments, another apparatus for a vehicle includes a vehicle communications network, a vehicle module coupled to the vehicle communications network, an authentication module coupled to the vehicle communications network, and an update module coupled to the vehicle communications network. The update module is configured to obtain, from a remote device, a programming update for the vehicle module that includes an authentication portion and a programming data portion, provide the programming data portion to the vehicle module via the vehicle communications network, and provide the authentication portion to the authentication module via the vehicle communications network. The authentication module is configured to authenticate the authentication portion and provide the authentication portion to the vehicle module after the authentication portion is authenticated. The vehicle module is configured to update a target application on the vehicle module based at least in part on the programming data portion after receiving the authentication portion from the authentication module.

DESCRIPTION OF THE DRAWINGS

The exemplary embodiments will hereinafter be described in conjunction with the following drawing figures, wherein like numerals denote like elements, and wherein:

FIG. 4 is a diagram illustrating a sequence of communications within the vehicle communications system of FIG. 1 in accordance with one exemplary embodiment of the programming process of FIG. 3.

DETAILED DESCRIPTION

Figure 1:
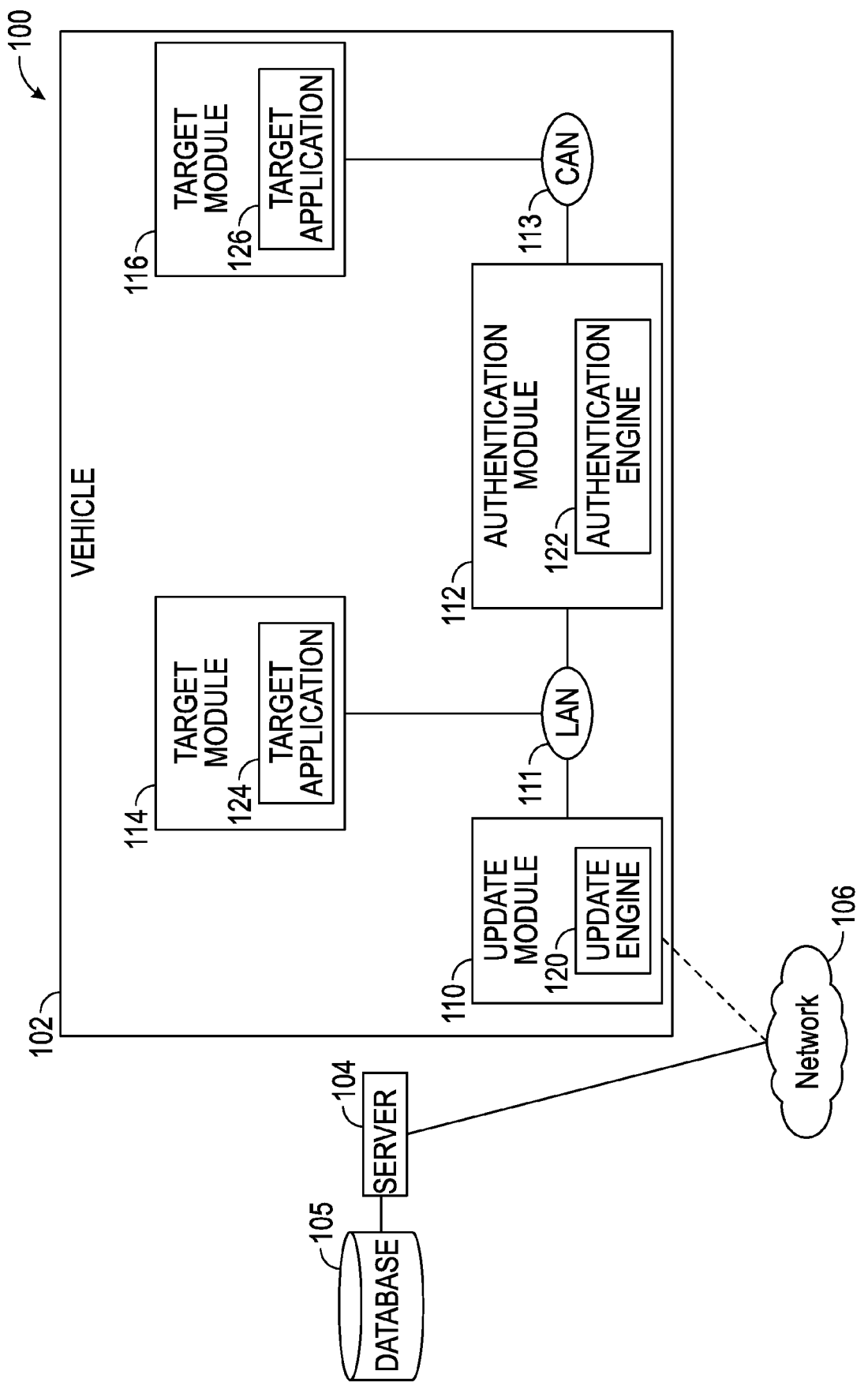
FIG. 1 is a block diagram of an exemplary vehicle communications system in accordance with one or more embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Embodiments of the subject matter described herein relate to programming a module in a vehicle, such as an automobile, using programming information obtained from a remote device. As described in greater detail below, a programming update for an application on a vehicle module to be programmed (alternatively referred to herein as a target application on a target module) includes a programming data portion and an authentication portion. The programming data portion is a file or another logical segment of data that includes a set of executable instructions (e.g., code, script, or the like), which are capable of being read and executed by the target module to change, modify, update, or otherwise influence the target application executing thereon. In other words, the target application is updated based at least in part on the programming data in response to the set of instructions from the programming data being executed by the target module. The authentication portion is another file or logical segment of data that includes one or more keys utilized to authenticate the source of the programming data as a trusted source. A module in the vehicle other than the target module obtains the programming update for the application on the target module from a remote device and transmits or otherwise provides the authentication portion to an authentication module in the vehicle via a vehicle communications network. For purposes of explanation, but without limitation, the programming data portion may alternatively be referred to herein as a programming data file, the authentication portion may alternatively be referred to herein as an authentication file, and the module that obtains the programming update may alternatively be referred to herein as an update module.

In exemplary embodiments, the authentication module stores or otherwise maintains one or more keys that are associated with the vehicle, and compares the one or more keys obtained from the authentication portion to the one or more stored keys to verify or otherwise confirm that the key(s) in the authentication portion match the stored key(s) associated with the vehicle. When the key(s) in the authentication portion match the stored key(s) associated with the vehicle, the authentication module provides the authentication portion to the target module. The update module also provides the programming data portion to the target module, either directly via the vehicle communications network or indirectly via the authentication module. In exemplary embodiments, the target module enters a programming mode after receiving both the programming data portion and the verified authentication portion, and the target module executes the set of instructions in the programming data portion to update the target application on the target module. In this regard, in some embodiments, in the absence of receiving the verified authentication portion, the target module fails to enter a programming mode and/or fails to execute the instructions in the programming data portion, thereby preventing the target module and/or the target application to be changed, modified, or otherwise influenced by instructions that are not received from a trusted source.

In alternate embodiments, the target module may enter a programming mode and/or execute the instructions in the programming data portion even in the absence of receiving the verified authentication portion, however, the verified authentication portion is configured such that its absence prevents the target module and/or the target application to be changed, modified, or otherwise influenced by instructions of in the programming data portion in the intended manner. For example, the authentication portion may be realized as a decryption key for the programming data portion, such that in the absence of receiving the authentication portion, the target module executes the encrypted (or improperly decrypted) instructions in the programming data portion, which prevents the instructions in the programming data portion from achieving their desired effect and/or results in the target module entering into an operating mode where its operation is limited or otherwise disabled (e.g., a fault mode). In another embodiment, the authentication portion may include a portion of the set of instructions that is required for the remaining instructions in the programming data portion to execute properly, such that when the target module executes (or attempts to execute) the instructions in the programming data portion, the intended effect of those instructions is not achieved and the execution may result in the target module entering into an operating mode where its operation is limited or otherwise disabled. Thus, instructions that are not received from a trusted source are prevented from changing, modifying, or otherwise influencing the operation of the target module and/or the target application in their intended manner.

Referring now to FIG. 1, in one or more exemplary embodiments, a vehicle communications system 100 includes a vehicle 102 capable of communicating with a remote device 104 via a communications network 106 that is external to the vehicle 102, such as, for example, a cellular network, a satellite network, a wireless network, a wide area network, or the like. In the illustrated embodiment, the vehicle 102 includes an update module 110 configured to communicate via the network 106 and download or otherwise receive, from the remote device 104 via the network 106, programming updates that are subsequently utilized to program or otherwise update one or more additional modules 114, 116 in the vehicle 102. In exemplary embodiments, the vehicle 102 includes an authentication module 112 that is communicatively coupled to the update module 110 and authenticates attempts to program the target modules 114, 116 in the vehicle 102. In this regard, when the authentication module 112 fails to authenticate programming of a particular target module 114, 116, the authentication module 112 prevents or otherwise restricts programming of that target module 114, 116, as described in greater detail below.

In one or more exemplary embodiments, the vehicle 102 is realized as an automobile, and depending on the embodiment, the vehicle 102 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 102 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor. In alternative embodiments, the vehicle 102 may be a plug-in hybrid vehicle, a fully electric vehicle, a fuel cell vehicle (FCV), or another suitable alternative fuel vehicle.

The remote device 104 generally represents a computing system or another combination of processing logic, circuitry, hardware, and/or other components that is coupled to the network 106 and capable of communicating programming updates to the vehicle 102 and supporting the processes, tasks, operations, and/or functions described herein. For example, in the illustrated embodiment of FIG. 1, the remote device 104 may be realized as a computer server that includes a processing system and a data storage element (or memory) capable of storing programming instructions, that, when read and executed by the processing system, cause the server to generate a programming update for a target module 114, 116 in the vehicle 102 and transmit the programming update to the update module 110. Accordingly, for purposes of explanation, the remote device 104 may alternatively be referred to herein as a server. In some embodiments, the server 104 may be coupled to a database 105 that stores or otherwise maintains executable code or instructions corresponding to various programming updates capable of being generated by the server 104 along with authentication information utilized to support the programming processes described in greater detail below in the context of FIGS. 3-4.

Still referring to FIG. 1, the update module 110 generally represents the device or component within the vehicle 102 that is communicatively coupled to the external communications network 106 and configured to support communications with the server 104 for purposes of obtaining programming updates for one or more target modules 114, 116 within the vehicle 102. In accordance with one or more embodiments, the update module 110 is realized as a head unit that may be integrated in the dashboard, instrument panel, center console, or another suitable location within the vehicle 102. In the illustrated embodiment, the update engine 120 generally represents a software module or another component that is generated, executed, or otherwise implemented by the update module 110 to facilitate the programming processes described herein.

In exemplary embodiments, the update module 110 is coupled to at least one vehicle communications network 111 and provides an interface between the external communications network 106 and the vehicle communications network 111. Depending on the embodiment, the vehicle communications network 111 may be realized as a local area network (LAN) or Ethernet network, a wireless network (e.g., a Bluetooth network, an IEEE 802.11 network, or the like), a controller area network (CAN), or the like. The authentication module 112 generally represents the device or component within the vehicle 102 that is communicatively coupled to the update module 110 via a first vehicle communications network 111 and configured to regulate or otherwise control programming of the target modules 114, 116 within the vehicle 102 by verifying or otherwise authenticating programming updates. The authentication engine 122 generally represents a software module or another component that is generated, executed, or otherwise implemented by the authentication module 112 to receive, from the update engine 120 via the network 111, an authentication file associated with a programming update, verify whether authentication information contained in the authentication file matches authentication information stored by the authentication module 112, and allow the programming update to be performed at the particular target module 114, 116 only after verifying the authentication information contained in the authentication file matches the stored authentication information, as described in greater detail below.

In accordance with one or more embodiments, the authentication module 112 also functions as a gateway between the first vehicle communications network 111 that the update module 110 communicates on and a second vehicle communications network 113 having one or more target modules 116 communicatively coupled thereto. For example, in one embodiment, the first vehicle communications network 111 is realized as an Ethernet network and the second vehicle communications network 113 is realized as a CAN, wherein the authentication module 112 provides a gateway between the Ethernet network and the CAN.

Still referring to FIG. 1, a target module 114, 116 generally represents any sort of hardware, component(s), device(s), or module(s) that is coupled to one or more vehicle communications networks 111, 113 and capable of being programmed by the update module 110, such as, for example, an engine control unit (ECUs), a traction control system (or traction controller), a power steering system (or power steering controller), a braking system (or brake controller), a climate control system (or climate controller), a navigation system (or navigation controller), an infotainment system, or the like. In the illustrated embodiment of FIG. 1, the target application 124, 126 generally represents a software module or another component that is generated, executed, or otherwise implemented by or on a respective target module 114, 116 to control, manage, or otherwise regulate the features and/or functionality provided by the respective target module 114, 116. For example, if the target module 114 is an infotainment system, the target application 124 may be the operating system for the infotainment system or an individual downloadable user application for the infotainment system. Similarly, if the target module 116 is a braking system, the target application 126 may be the application that controls the anti-lock braking functionality of the braking system.

In exemplary embodiments, a programming update obtained by the update module 110 and/or the update engine 120 from the server 104 includes a set of executable instructions (e.g., code, script, or the like) that are capable of being read and executed by the intended target module 114, 116 (or a component thereof) to modify operation of its respective target application 124, 126. For example, the existing code or instructions for implementing the respective target application 124, 126 may be modified (e.g., by adding or incorporating new code or instructions, deleting or overwriting at least a portion of the existing code or instructions, and the like) and/or the parameters, settings and/or other configuration information referenced by the code or instructions of the respective target application 124, 126 may be modified (e.g., changing or overwriting existing configuration information, adding or incorporating new configuration information referenced by existing and/or new code or instructions, and the like). Modifying the underlying code and/or configuration information upon which a respective application 124, 126 is based on influences the subsequent operation of the respective application 124, 126, which, in turn, influences subsequent operation of its associated target module 114, 116. In this manner, programming updates received from the server 104 may be applied to a target module 114, 116 to modify existing features and/or functionality of the target module 114, 116 or provide new features and/or functionality to the target module 114, 116.

It should be understood that FIG. 1 is a simplified representation of a vehicle communications system 100 for purposes of explanation and is not intended to limit the scope or applicability of the subject matter described herein in any way. In this regard, practical embodiments of the vehicle 102 may include any number of potential target modules 114, 116 and/or any number of vehicle communications networks 111, 113 to support or otherwise provide any number of features and/or functionality for the vehicle 102. Additionally, in alternative embodiments, the remote device 104 may be realized as an external device that is communicatively coupled to the update module 110 via an input interface coupled to the update module 110 as described in greater detail below in the context of FIG. 2, and in such embodiments of the vehicle communications system 100, the external communications network 106 and/or the database 105 may not be present.

Figure 2:
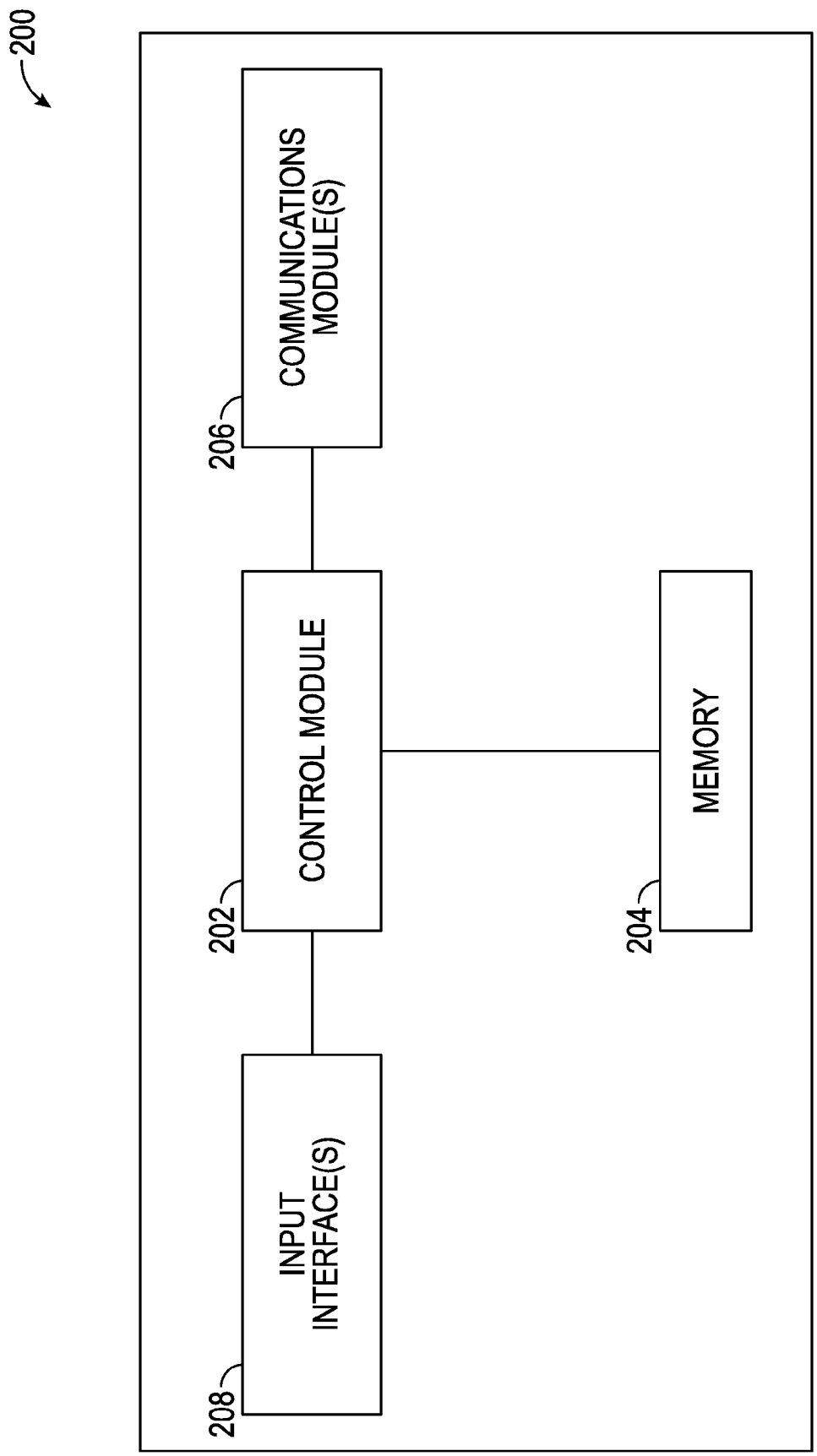
FIG. 2 is a block diagram of an exemplary electronic device suitable for use in the vehicle communications system of FIG. 1 in accordance with one or more embodiments.

FIG. 2 depicts an exemplary embodiment of an electronic device 200 suitable for use in the vehicle communications system 100 of FIG. 1. For example, the server 104 and/or one or more of the modules 110, 112, 114, 116 may be realized as an instance of the electronic device 200. The illustrated electronic device 200 includes, without limitation, a control module 202, a data storage element (or memory) 204, one or more communications modules 206, and one or more input interfaces 208. It should be understood that FIG. 2 is a simplified representation of an electronic device 200 for purposes of explanation and is not intended to limit the scope or applicability of the subject matter described herein in any way.

The control module 202 generally represents the hardware, circuitry, processing logic, and/or other components of the electronic device 200 configured to support operation of the electronic device 200 and the various tasks, operations, functions and/or processes described herein. Depending on the embodiment, the control module 202 may be implemented or realized with a general purpose processor, a microprocessor, a controller, a microcontroller, a state machine, a content addressable memory, an application specific integrated circuit, a field programmable gate array, any suitable programmable logic device, discrete gate or transistor logic, discrete hardware components, or any combination thereof, designed to perform the functions described herein. Likewise, depending on the embodiment, the memory 204 may be realized using any sort of random access memory (RAM), read only memory (ROM), flash memory, registers, hard disks, removable disks, magnetic or optical mass storage, short or long term storage media, and/or any other non-transitory computer-readable medium capable of storing programming instructions for execution by the control module 202. The computer-executable programming instructions, when read and executed by the control module 202, cause the control module 202 to perform or otherwise support the various tasks, operations, functions, and processes described herein.

For example, referring to FIG. 1 and with continued reference to FIG. 2, when the update module 110 is realized as an instance of the electronic device 200, the memory 204 may store executable code, script, and/or instructions corresponding to the update engine 120 that, when read and executed by the control module 202, cause the control module 202 to generate the update engine 120 configured perform the various tasks, operations, functions, and processes described herein. Likewise, when the authentication module 112 is realized as an instance of the electronic device 200, the memory 204 may store executable code, script, and/or instructions that, when read and executed by the control module 202, cause the control module 202 to generate the authentication engine 122. In a similar manner, when a target module 114, 116 is realized as an instance of the electronic device 200, the memory 204 stores executable code, script, and/or instructions corresponding to the respective application 124, 126 that is generated, executed, or otherwise implemented by that respective target module 114, 116. Additionally, the memory 204 may store various parameters, settings and/or other configuration information referenced by the code or instructions of the respective target application 124, 126 to provide the desired features and/or functionality for the target module 114, 116. As described in greater detail below in the context of FIGS. 3-4, after programming or updating of a target module 114, 116 is authenticated, verified, or otherwise approved, the control module 202 of that target module 114, 116 executes the set of instructions contained in a programming data file received from the update module 110 and/or the update engine 120 to modify, overwrite, or otherwise update the code and/or configuration information for the respective target application 124, 126 that is maintained in the memory 204, thereby updating the target application 124, 126 of the target module 114, 116.

Referring again to FIG. 2, the communications module(s) 206 generally represents the hardware, circuitry, logic, firmware and/or other components of the electronic device 200 configured to support communications to/from the electronic device 200 via one or more communications networks. For example, referring again to FIG. 1 and with continued reference to FIG. 2, when the update module 110 is realized as an instance of the electronic device 200, the electronic device 200 may include a first instance of a communications module 206 that supports communications over the external communications network 106, such as one or more transceiver modules (e.g., a cellular transceiver), and a second instance of a communications module 206 that supports communications over the first vehicle communications network 111, such as a network adapter (e.g., an Ethernet adapter, an 802.11 adapter, a Bluetooth adapter, or the like). Similarly, when the authentication module 112 is realized as an instance of the electronic device 200, a first instance of a communications module 206 within the electronic device 200 may be realized a first network adapter (e.g., an Ethernet adapter, an 802.11 adapter, a Bluetooth adapter, or the like) that supports communications over the first vehicle communications network 111 and a second instance of a communications module 206 within the electronic device 200 may be realized as a second network adapter (e.g., a CAN interface, or the like) that supports communications over the second vehicle communications network 113.

Still referring to FIG. 2, the input interface(s) 208 generally represents the hardware, circuitry, and/or other components that provide a physical interface to/from the electronic device 200 for receiving input and/or output from a user or another external hardware component. For example, the input interface(s) 208 may include one or more buttons, keys, touch panels (or touchscreens), computer mice, sensors, transducers, or other suitable devices adapted to receive input from a user. In some embodiments, the input interface(s) 208 may also include one or more ports or slots, such as, for example, a universal serial bus (USB) port, a memory card slot, or the like. In this regard, although the subject matter may be described herein in the context of the update module 110 receiving programming updates from the server 104 via the network 106, in alternative embodiments, the update module 110 may obtain programming updates from an external remote device that is inserted into an input interface coupled to the update module 110. For example, referring again to FIG. 1, when the update module 110 is realized as an instance of the electronic device 200, the update module 110 may obtain programming updates from an external disk drive, an external memory card, or another external device that is inserted into an input interface 208 of the update module 110.

Figure 3:
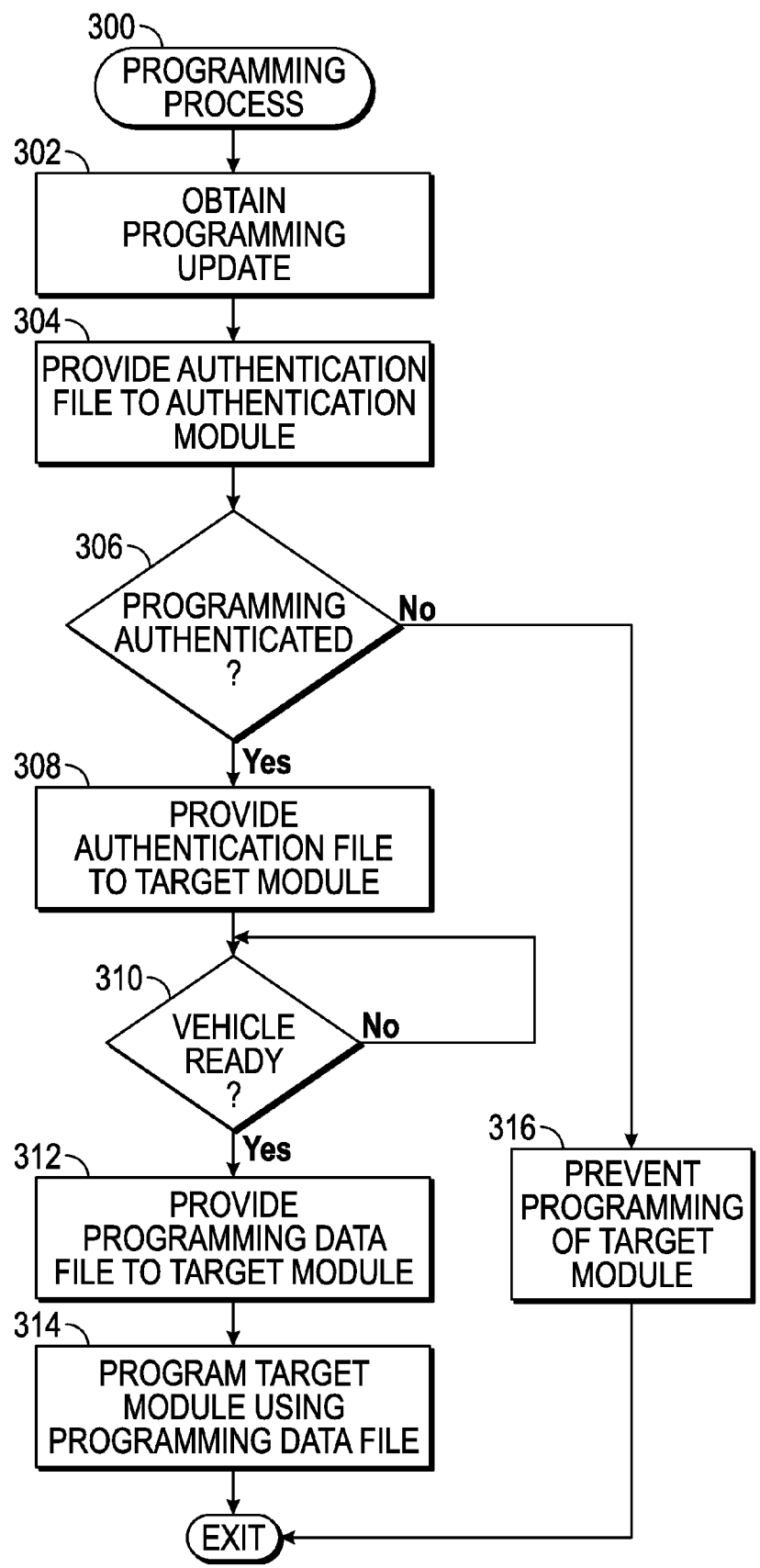
FIG. 3 is a flow diagram illustrating an exemplary programming process suitable for implementation by the vehicle communications system of FIG. 1 in accordance with one or more embodiments.

FIG. 3 depicts an exemplary embodiment of a programming process 300 for programming or otherwise updating a target module in a vehicle. The various tasks performed in connection with the illustrated process 300 may be performed by hardware, suitably configured analog circuitry, software executed by processing circuitry, firmware executable by processing circuitry, or any combination thereof. For illustrative purposes, the following description may refer to elements mentioned above in connection with FIGS. 1-2. In practice, portions of the programming process 300 may be performed by different elements of the vehicle communications system 100, such as, for example, the server 104, the update module 110, the authentication module 112, a target module 114, 116, the control module 202, the memory 204, the communications module 206 and/or the input interface 208. It should be appreciated that practical embodiments of the programming process 300 may include any number of additional or alternative tasks, the tasks need not be performed in the illustrated order and/or the tasks may be performed concurrently, and/or the programming process 300 may be incorporated into a more comprehensive procedure or process having additional functionality not described in detail herein. Moreover, one or more of the tasks shown and described in the context of FIG. 3 could be omitted from a practical embodiment of the programming process 300 as long as the intended overall functionality remains intact.

In exemplary embodiments, the programming process 300 begins by receiving or otherwise obtaining a programming update for a particular target module in a vehicle at 302. For example, in accordance with one or more embodiments, the update module 110 periodically polls the server 104 over the network 106 for programming updates that are applicable to any of the target modules 114, 116 in the vehicle 102. In other embodiments, a user may manipulate an input interface 208 of the update module 110 to indicate a desire to check for updates for the vehicle modules 114, 116, which, in turn, results in the update module 110 transmitting a request for programming updates to the server 104. In yet other embodiments, a user may manipulate an input interface 208 of a target module 114, 116 in the vehicle 102 to indicate a desire to check for updates to the application 124, 126 on that target module 114, 116, which, in turn, results in the target module 114, 116 transmitting a request for programming updates to the update module 110.

In accordance with one or more embodiments, to obtain a programming update from the server 104, the update engine 120 on the update module 110 generates a polling request that includes identification information (e.g., a vehicle identification number or the like) stored or otherwise maintained by the update module 110 (e.g., in memory 204), which, in turn, is utilized by the server 104 to identify or otherwise determine the particular model for the vehicle 102 and/or current versioning information for the target applications 124, 126 of the target modules 114, 116 in the vehicle 102. Using the identification information, the server 104 may query or otherwise access the database 105 to determine whether any programming updates exist that are applicable to the vehicle 102 (e.g., programming updates associated with any of the target modules 114, 116 onboard the vehicle 102). In response to identifying an update for one of the target modules 114, 116 in the vehicle 102, the server 104 generates a programming update for the vehicle 102 and transmits or otherwise provides that programming update to the update engine 120 on the update module 110 via the network 106.

As described above, the programming update generated by the server 104 includes an authentication file and a programming data file. To generate the authentication file, the server 104 may utilize the identification information for the vehicle 102 to query or otherwise access the database 105 to obtain the one or more private keys and/or other authentication information associated with the vehicle 102 that are also stored or otherwise maintained by the authentication module 112 in the vehicle 102, and the server 104 includes or otherwise encapsulates that obtained authentication information in the authentication file. Similarly, to generate the programming data file, the server 104 may utilize the identification information for the vehicle 102 to query or otherwise access the database 105 to obtain the set of instructions corresponding to the program update for the intended target module 114, 116 and include or otherwise encapsulate that set of instructions in the programming data file.

It should be noted that in other embodiments, instead of the update module 110 periodically polling the server 104 for programming updates, the server 104 may automatically push programming updates to the update module 110, either on a periodic basis or as programming updates become available. For example, the server 104 may periodically access the database 105 to compare stored versioning information for the target applications 124, 126 in the vehicle 102 to current versioning information associated with program updates for those target applications 124, 126 maintained by the database 105. When the versioning information indicates a target application 124, 126 on a target module 114, 116 should be updated (e.g., because the current versioning information associated with programming updates for those target applications 124, 126 maintained by the database 105 indicates the programming updates are newer), the server 104 automatically generates a programming update for that respective target module 114, 116 and pushes or otherwise transmits the programming update to the update module 110.

In yet other embodiments, the update module 110 and/or the update engine 120 may obtain the programming update from an external device (e.g., an external memory drive, card, disk, or the like) inserted in an input interface 208 of the update module 110. For example, a programming update generated by the server 104 may be stored or otherwise saved on an external device that is capable of being inserted in the input interface 208 of the update module 110. Upon insertion of an external device in the input interface 208, the update engine 120 and/or the control module 202 may automatically scan or otherwise access the external device via the input interface 208 to obtain any programming updates for the target module(s) 114, 116 in the vehicle 102 that reside on the external device.

Still referring to FIG. 3, after obtaining the programming update, the programming process 300 continues by providing the authentication file from the programming update to the authentication module in the vehicle at 304. For example, in one or more embodiments, the update engine 120 transmits the authentication file to the authentication engine 122 on the authentication module 112 via the network 111 automatically in response to receiving the programming update. After the authentication file is provided to the authentication module, the programming process 300 continues by determining whether the programming update is authenticated, verified, or otherwise allowed based on the authentication file at 306, and when the programming update is authenticated, the programming process 300 continues by transmitting or otherwise providing the authentication file to the target module at 308. In response to receiving the authentication file, the authentication engine 122 compares the authentication information in the authentication file with authentication information stored by the authentication module 112 to determine whether they match. In this regard, the authentication engine 122 parses or otherwise analyzes the authentication file to obtain the keys and/or other authentication information included in the authentication file by the server 104 or other entity responsible for generating the authentication file. When the keys and/or other authentication information obtained from the authentication file matches the keys and/or other authentication information stored in the memory 204 of the authentication module 112, the authentication engine 122 transmits or otherwise provides the verified authentication file to the intended target module 114, 116.

In the illustrated embodiment, the programming process 300 continues by determining or otherwise identifying whether a programming session can be initiated with the target module to be updated at 310. In this regard, the update module 110 and/or the update engine 120 may maintain (e.g., in memory 204) programming criteria that limit what operating state(s) that a particular target module 114, 116 and/or other components of the vehicle 102 are required to be operated in before programming of that particular target module 114, 116 can be initiated. For example, if the target module 114, 116 is an ECU, a brake controller, a steering controller, or the like, the programming criteria may require that the target module 114, 116 is in an idle state and that the transmission in the vehicle 102 is locked or otherwise in the parked position before programming of the target module 114, 116 can be initiated. Conversely, if the target module 114, 116 is a climate controller (or climate control system), the programming criteria may require that only the climate control system be in an idle or deactivated state (e.g., turned off). In this regard, the update module 110 and/or the update engine 120 obtains or otherwise identifies the current status of the target module(s) 114, 116 and/or other vehicle components and determines whether the programming session can be initiated based on the programming criteria for the intended target module 114, 116 and the obtained status of the target module(s) 114, 116 and/or other vehicle components. In exemplary embodiments, when the update module 110 and/or the update engine 120 determines that the programming session cannot be initiated (e.g., because the current status of a target module 114, 116 does not satisfy the applicable programming criteria), the update module 110 and/or the update engine 120 stores or otherwise maintains the programming update in memory 204 and periodically repeats the steps of obtaining the current status of the target module(s) 114, 116 and/or other vehicle components and comparing the obtained status to the programming criteria associated with the intended target module 114, 116.

When programming process 300 determines the current status of the target module and/or other vehicle components satisfy the programming criteria for the target module, the programming process 300 is completed by transmitting or otherwise providing the programming data file from the programming update to the target module for the programming update at 312 and programming the target module using the programming data file at 314. In this regard, if the intended target module 114 is on the same communications network 111 as the update module 110, the update module 110 and/or the update engine 120 transmits the programming data file to the target module 114 via the communications network 111. In other embodiments, if the intended target module 116 is on a different communications network 113 behind the authentication module 112, the update module 110 and/or the update engine 120 transmits the programming data file to the target module 116 via the authentication module 112 which functions as a gateway between the first communications network 111 and the second communications network 113.

It should be noted that in some embodiments, the update module 110 and/or the update engine 120 may transmit the programming data file to the target module 114 via the communications network 111 prior to and/or independently of the authentication file being authenticated by the authentication engine 122. In other words, the update module 110 and/or the update engine 120 may transmit the programming data file to the target module 114 via the communications network 111 in parallel with the authentication engine 122 authenticating the authentication file and before the authentication file has been verified. For example, the update engine 120 may transmit the programming data file to the application 124, which, in turn stores the set of instructions from the programming data file in the memory 204 of the target module 114 at a location such that the instructions are only executed after the target module 114 receives the verified authentication file and enters a programming mode. In such embodiments, when the programming update is not authenticated, the authentication engine 122 may notify the application 124 that the programming update is not authenticated, which, in turn, causes the application 124 to delete or otherwise remove the instructions from the programming data file in the memory 204 to ensure that the application 124 is maintained in its current version. In other embodiments, the application 124 may automatically delete or otherwise remove the code, script and/or instructions from the programming data file from the memory 204 after a threshold amount of time has elapsed without the target module 114 entering a programming mode.

In accordance with one or more embodiments, to implement the programming update, the update engine 120 and/or the authentication engine 122 signals or otherwise commands the intended target module 114, 116 to enter a programming mode. In some embodiments, the target module 114, 116 may be configured such that the programming mode is only entered after the target module 114, 116 has received an authenticated authentication file from the authentication engine 122. In this regard, a target module 114, 116 may fail to enter a programming mode in response to receiving a programming mode command from the update engine 120 when the authentication file has not been provided to the target module 114, 116 by the authentication module 112 and/or the authentication engine 122. In yet other embodiments, the user may manipulate an input interface 208 of the target module 114, 116 to cause the target module 114, 116 to enter the programming mode (e.g., as part of a check for updates). When the target module 114, 116 is in the programming mode, the target module 114, 116 is configured to automatically execute or otherwise implement the set of instructions from the programming data file to modify its respective target application 124, 126, as described above. For example, in response to receiving a command to enter the programming mode from the update engine 120 after receiving an authenticated authentication file from the authentication engine 122, a target module 114, 116 may enter a boot mode (or boot loader mode) to place the control module 202 in a state where the control module 202 automatically executes the instructions contained in the programming data file upon receipt of the programming data file from the update module 110 and/or the update engine 120.

Still referring to FIG. 3, in response to determining the programming update is not authenticated, the programming process 300 prevents or otherwise restricts programming of the target module at 316. For example, in accordance with one or more embodiments, when the authentication information in the authentication file from the update module 110 does not match the stored authentication information maintained by the authentication module 112, the authentication engine 122 may fail to provide the authentication file to the target module 114, 116 and discard or otherwise delete the unauthenticated authentication file from the authentication module 112. Accordingly, in embodiments where the target module 114, 116 is configured to enter a programming mode only after it has received an authenticated authentication file from the authentication module 112, the target module 114, 116 may fail to enter a programming mode in response to signals or commands from the update module 110 and/or the update engine 120, thereby preventing the programming update from being implemented by the target module 114, 116. As described above, in some embodiments, the authentication engine 122 may notify the application 124 to delete or otherwise remove any code, script and/or instructions from the programming data file in the memory 204 of the target module 114 to ensure that the programming update is not implemented. In embodiments where the intended target module 116 for the programming update is behind the authentication module 112 on a different communications network 113 than the update module 110, the authentication module 112 may prevent programming of the target module 116 by failing to route the programming data file and/or other commands received from the update module 110 to the target module 116.

FIG. 4 depicts an exemplary sequence 400 of communications within the vehicle communications system 100 in accordance with an exemplary embodiment of the programming process 300 of FIG. 3. Referring to FIG. 4, and with continued reference to FIGS. 1-3, the illustrated sequence 400 begins with the update module 110 downloading, receiving, or otherwise obtaining 402 a programming update from a remote device 104, such as a server or an external memory drive (or disk or card). After obtaining the programming update, the update module 110 and/or the update engine 120 transmits 404 the authentication file from the programming update to the authentication engine 122 on the authentication module 112 via the first communications network 111. After the authentication engine 122 authenticates the authentication file, the authentication engine 122 transmits or otherwise provides 406 the authentication file to the intended target module 114, 116 via the appropriate communications network 111, 113.

As described above, after determining that programming criteria applicable to the programming update are satisfied, the implementation of the programming update is achieved by the update engine 120 on the update module 110 transmitting or otherwise providing 408 the programming data file that is executed by the intended target module 114, 116 while the target module 114, 116 operates in a programming mode. When the target module 114 is on the same communications network 111 as the update module 110, the update engine 120 transmits the programming data file directly to the target module 114 over the communications network 111. In some embodiments, the update engine 120 may signal or otherwise command the target module 114 to enter a programming mode after determining that the applicable programming criteria are satisfied and prior to transmitting the programming data file. In other embodiments where the target module 116 is on a different communications network 113 than the update module 110, the update engine 120 transmits the programming data file to the authentication engine 122 on the authentication module 112 via the first communications network 111, wherein the authentication engine 122 routes or otherwise retransmits the programming data file to the target module 116 over the second communications network 113 when the programming update is authenticated. After the target module 114, 116 has received both the authentication file from the authentication module 112 and the programming data file from the update module 110 and entered into a programming mode, the code, script and/or instructions in the programming data file are executed or otherwise performed by the control module 202 of the target module 114, 116 to effectuate the desired update to the target application 124, 126.

One benefit of the subject matter described herein is that programming updates obtained from a remote device are not implemented unless they are authenticated as likely originating from a trusted source. Thus, applications on vehicle modules may be securely programmed or otherwise updated using executable code, script and/or instructions received over an external network (e.g., a cellular network or the like) without requiring the vehicle to be serviced manually at a particular location (e.g., by a technician at a dealership).

For the sake of brevity, conventional techniques related to communications networks, authentication, software updating, automotive electronics and/or electrical systems, and other functional aspects of the subject matter may not be described in detail herein. In addition, certain terminology may also be used herein for the purpose of reference only, and thus are not intended to be limiting. For example, the terms "first", "second" and other such numerical terms referring to structures do not imply a sequence or order unless clearly indicated by the context. Additionally, the foregoing description also refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. A vehicle comprising:
    a target module coupled to a vehicle communications network;
    an authentication module coupled to the vehicle communications network to:
        receive an authentication portion of a programming update for the target module via the vehicle communications network; and
        provide the authentication portion to the target module via the vehicle communications network after the authentication portion is authenticated as originating from a trusted source; and
    an update module to obtain the programming update for the target module from a remote device, the programming update including the authentication portion and a programming data portion, wherein the update module is coupled to the vehicle communications network to:
        provide the programming data portion to the target module via the vehicle communications network; and
        provide the authentication portion to the authentication module via the vehicle communications network,
    wherein the target module is configured to update a target application on the target module based at least in part on the programming data portion received from the update module after receiving the authentication portion from the authentication module.

2. The vehicle of claim 1, the programming data portion including a set of instructions, wherein the target module updates the target application by executing the set of instructions.

3. The vehicle of claim 2, the target module including a data storage element to maintain configuration information for the target application, wherein the target module overwrites the configuration information with updated configuration information in response to executing the set of instructions.

4. The vehicle of claim 2, the target module including a data storage element to maintain code for the target application, wherein the target module overwrites the code with updated application code in response to executing the set of instructions.

5. The vehicle of claim 1, the authentication module including a data storage element to maintain a stored key associated with the vehicle, wherein the authentication module is configured to authenticate the authentication portion when a key obtained from the authentication portion matches the stored key.

6. The vehicle of claim 1, wherein the update module is coupled to an external network to obtain the programming update from the remote device via the external network.

7. The vehicle of claim 1, the update module including an input interface to receive the remote device, wherein the update module obtains the programming update from the remote device via the input interface.

8. The vehicle of claim 1, wherein:
the target module comprises an engine control unit; and
the update module comprises a head unit.

9. A method of programming a vehicle module coupled to a vehicle communications network, the method comprising:
obtaining, by an update module coupled to the vehicle communications network, a programming update for the vehicle module from a remote device, the programming update including an authentication portion and a programming data portion;
providing, by the update module via the vehicle communications network, the authentication portion to an authentication module coupled to the vehicle communications network;
providing, by the update module via the vehicle communications network, the programming data portion to the vehicle module;
providing, by the authentication module via the vehicle communications network, the authentication portion received from the update module to the vehicle module after authenticating the remote device based on the authentication portion; and
updating, by the vehicle module, a target application on the vehicle module based at least in part on the programming data portion received from the update module after the providing, by the authentication module, the authentication portion to the vehicle module.

10. The method of claim 9, the programming data portion including a set of instructions, wherein updating the target application comprises the vehicle module executing the set of instructions.

11. The method of claim 9, further comprising authenticating, by the authentication module, the authentication portion when a key obtained from the authentication portion matches a stored key associated with a vehicle having the vehicle module.

12. The method of claim 9, wherein obtaining the programming update comprises downloading the programming update from a server via an external communications network.

13. The method of claim 9, the remote device being inserted in an input interface, wherein obtaining the programming update comprises obtaining the programming update from the remote device via the input interface.

14. The method of claim 9, wherein obtaining the programming update comprises the update module receiving the programming update via an external communications network.

15. A vehicle comprising:
a vehicle communications network;
a vehicle module coupled to the vehicle communications network;
an authentication module coupled to the vehicle communications network to:
receive an authentication portion of a programming update via the vehicle communications network;
authenticate a remote device based on the authentication portion; and
provide the authentication portion to the vehicle module via the
vehicle communications network after the remote device is authenticated; and
an update module to obtain the programming update for the vehicle module from the remote device, the programming update including the authentication portion and a programming data portion, wherein the update module is coupled to the vehicle communications network to:
provide the programming data portion to the vehicle module via the vehicle communications network; and
provide the authentication portion to the authentication module via the vehicle communications network,
wherein the vehicle module is configured to update a target application on the vehicle module based at least in part on the programming data portion received from the update module after receiving the authentication portion from the authentication module.

16. The vehicle of claim 15, wherein the update module is coupled to an external communications network to receive the programming update from the remote device via the external communications network.

17. The vehicle of claim 15, further comprising an input interface coupled to the update module, wherein the update module is configured to obtain the programming update from the remote device when the remote device is inserted in the input interface.

18. The vehicle of claim 15, wherein:
the vehicle module comprises an engine control unit; and
the update module comprises a head unit.

* * * * *